United States Patent [19]

Yokoya

[11] Patent Number: 4,486,898
[45] Date of Patent: Dec. 4, 1984

[54] AMPLITUDE LIMITER FOR AM BROADCAST TRANSMITTER

[75] Inventor: Satoshi Yokoya, Chofu, Japan
[73] Assignee: Sony Corporation, Tokyo, Japan
[21] Appl. No.: 416,327
[22] Filed: Sep. 9, 1982
[30] Foreign Application Priority Data Sep. 11, 1981 [JP] Japan .................. 56-143616

[51] Int. Cl.³ .............................. H04H 5/00
[52] U.S. Cl. ......................... 381/15; 381/16
[58] Field of Search ............... 381/16, 15, 2; 332/37 R, 37 D, 38, 40, 41; 455/103, 108, 109, 114

[56] References Cited

U.S. PATENT DOCUMENTS 3,007,005 10/1961 Moore et al. ............ 381/16
4,236,042 11/1980 Leitch ..................... 381/16
4,323,731 4/1982 Hershberger ............ 381/16
4,338,491 7/1982 Parker et al. ............ 381/16

Primary Examiner—Stafford D. Schreyer
Assistant Examiner—W. J. Brady
Attorney, Agent, or Firm—Lewis H. Eslinger; Alvin Sinderbrand

[57] ABSTRACT

An amplitude limiter for an AM broadcast transmitter to minimize energy in the broadcasted signal outside an allocated broadcast bandwidth. The secondary and higher order spectra (i.e. second and higher harmonics) of a broadcasted AM stereophonic signal are minimized by limiting the amplitude of the audio signal, prior to modulation onto the carrier, within a predetermined portion of the audio frequency range. This is achieved by controlling the gain of the audio signals in that predetermined portion as a function of the level of a submodulation component also within that predetermined portion of the audio frequency range.

31 Claims, 7 Drawing Figures

AMPLITUDE LIMITER FOR AM BROADCAST TRANSMITTER

BACKGROUND OF THE INVENTION

This invention relates to an amplitude limiter for use in an AM broadcast transmitter and, more particularly, to such an amplitude limiter which is particularly adapted for amplitude modulated (AM) stereophonic transmission wherein energy of the broadcasted AM stereo signal is substantially constrained within an allocated broadcast bandwidth, thereby minimizing energy of the AM stereo signal which might be present outside this allocated bandwidth.

In amplitude modulated (AM) transmission systems, the level, or degree, of the modulating signal should be limited to prevent excessive or overmodulation of the carrier. Such overmodulation, generally in excess of 100%, may result in distortion of the information signal which is recovered at a transmitter and, also, may result in the generation of second order and higher harmonics, generally referred to as higher order spectra. Typically, for radio broadcast purposes, a transmitted or broadcasted signal is limited to an allocated bandwidth. In the United States, this bandwidth is limited to 30 KHz symmetrically disposed with respect to the carrier frequency. Hence, with a carrier frequency of $\omega_c$, energy of the AM signal having this carrier must be limited so as to have little, if any, energy outside the bandwidth of $\omega_c \pm 15$ KHz.

Generally, the information signal which is used to amplitude modulate the carrier in most radio broadcast systems is an audio signal. As is known, the amplitude of an audio signal, which represents sound such as voice and music, exhibits a wide dynamic range. In the absence of any limiting circuitry, it is possible that the audio signal which modulates the carrier may exhibit a sudden large increase in amplitude. As a result, the carrier may be overmodulated, thereby generating harmonics, or higher order spectra, outside the allocated bandwidth. The energy of such higher order spectra will, therefore, be present in the bandwidth which is allocated to another carrier frequency, thereby interfering and distorting the signal which is transmitted by that other carrier.

This problem of overmodulation in relatively simple AM transmission systems has been solved by limiting the modulation level of the audio signals to no more than 100% and, in many instances, the audio signal is limited to a level of 95 to 100%. However, when an AM transmission system is utilized to broadcast compatible stereophonic signals, such a relatively simple amplitude limiter does not fully satisfy the requirement of minimizing energy in the broadcasted signal outside the 30 KHz bandwidth.

The signal transmitted by a compatible AM stereo broadcast system must contain modulated information that can be received and recovered by conventional monaural receivers as well as stereo information which can be recovered by special stereophonic receivers, the latter being operative to reproduce stereophonic sound. Accordingly, a monaural, or "mono" component is used to amplitude modulate the carrier, and the "stereo" component, referred to herein as the submodulation component, is used to modulate either another characteristic of the carrier or an additional subcarrier. Various proposals have been made for a so-called AM-PM AM stereo system, wherein the mono component is used to amplitude modulate the carrier and the submodulation, or stereo, component is used to modulate the phase of that carrier. Such an AM-PM broadcast signal is compatible with monaural receivers because the amplitude modulated mono signal is readily recovered therefrom. Likewise, this AM-PM signal, when detected by special receivers designed therefor, permits the mono component to be recovered as well as the stereo, submodulation component, and these components then may be further processed, as by matrixing, to reproduce stereophonic sound. Other proposals have contemplated amplitude modulation or frequency modulation of a subcarrier by the submodulation, or stereo, component. These other proposals have been known as AM-AM and AM-FM systems.

The mono component of an AM stereo signal is recognized as the (L+R) component; and the submodulation, or stereo, component is recognized as the (L−R) component, wherein L and R represent the left-channel and right-channel signals, respectively, in an audio broadcast system. Overmodulation due to the mono component (L+R) may be avoided by limiting the amplitude of the left-channel signal (L) and the right channel signal (R), respectively. However, even if the sum of the left-channel and right-channel modulating levels is limited in this manner, the level of the submodulation component (L−R) still may be so great as to result in harmonics in the broadcasted signal, which harmonics lie outside the bandwidth allocated to the broadcast frequency.

One type of limiter which has been proposed for AM transmission includes a variable gain amplifier for amplifying the mono component with a gain that is controlled as a function of the level of that amplified component. The amplified mono component, that is, the output of the variable gain amplifier, is rectified and compared to a threshold level which represents a modulation degree of 95% to 100%. If the output of the amplifier exceeds this threshold level, which otherwise would result in overmodulation of the carrier, the gain of the amplifier is reduced. To use this limiter in an AM stereo transmission system, separate controllable variable gain amplifiers may be used, one to control the amplified level of the mono component (L+R) and the other to control the amplified level of the submodulation component (L−R). The respective threshold levels which are used to control the gains of these amplifiers may be established such that the levels of the mono and submodulation components, together, do not exceed 100%.

The present invention proceeds on the recognition that secondary and higher harmonics of the AM stereo signal may be produced even if the submodulation component in the frequency range of from one-fourth to one-half the allocated bandwidth (e. g. the submodulation component having frequencies in the range of 7.5 KHz to 15 KHz) has a level that is substantially less than 100%. That is, substantial amounts of energy will be present in an adjacent allocated broadcast bandwidth if the level of the audio signals in this frequency range exceed 50%. However, typical amplitude limiters, such as that described above, do not perform a frequency-selective limiting operation and, thus, undesired higher order spectra nevertheless may be produced even when the aforementioned amplitude limiter limits the combined modulation level of the mono and submodulation components to 100%.

OBJECTS OF THE INVENTION

Therefore, it is an object of the present invention to provide an improved amplitude limiter for use in an AM broadcast transmitter to minimize energy in the broadcasted signal outside an allocated broadcast bandwidth.

Another object of this invention is to provide an amplitude limiter for use in an AM stereo transmission system, wherein secondary spectra, or harmonics, are minimized in frequency regions that lie outside of an allocated bandwidth.

A further object of this invention is to provide an amplitude limiter for use in an AM stereo broadcast system, wherein the AM stereo signals which are broadcasted on a particular frequency include very little harmonic energies outside the allocated broadcast bandwidth and, thus, distortion and interference with signals broadcasted on other frequencies in, for example, adjacent broadcast bandwidths, are minimized.

An additional object of this invention is to provide an improved amplitude limiter which is readily adapted for use in an AM stereo broadcast transmission system, wherein the amplitude of audio signals within a particular frequency range is dynamically limited.

Yet another object of this invention is to provide an improved amplitude limiter for use with an AM stereo broadcast system of the type wherein a mono component and a submodulation component are derived from left-channel and right-channel signals, and wherein the amplitudes of the left-channel and right-channel signals within a predetermined frequency range are controlled as a function of the submodulation component within this range.

A still further object of this invention is to provide an amplitude limiter of the aforementioned type wherein the amplitudes of the left-channel and right-channel signals within higher frequency ranges are further limited.

Various other objects, advantages and features of the present invention will become readily apparent from the ensuing detailed description, and the novel features will be particularly pointed out in the appended claims.

SUMMARY OF THE INVENTION

In accordance with this invention, an improved amplitude limiter is provided for use in an AM broadcast transmitter to minimize energy in the broadcasted signal outside an allocated broadcast bandwidth. Left-channel and right-channel signals within a predetermined frequency range are provided, and each channel is filtered by a low pass channel and a higher pass channel. Each higher pass channel includes a variable gain amplifier for amplifying with controllable gain the left-channel or right-channel signal passed therethrough. A left-channel summer sums the left-channel signals passed by the left-channel higher pass channel and the left-channel low pass channel. A right-channel summer likewise sums the right-channel signals passed by the right-channel higher pass channel and the right-channel low pass channel. The gains of the variable gain amplifiers included in both the left-channel and right-channel higher pass channels are controlled as a function of the submodulation component of the AM signal to be broadcasted, which submodulation component lies within a predetermined frequency band within the aforementioned frequency range. In particular, the gains of the variable gain amplifiers are reduced when the submodulation component within this frequency band exceeds a predetermined level.

In accordance with one aspect of this invention, the amplitude limiter is used in an AM stereo transmission system. In one embodiment thereof, the predetermined frequency range of the left-channel and right-channel signals is established by respective low pass filters whose cut-off frequencies are on the order of about one-half the allocated broadcast bandwidth. In another embodiment, the aforementioned low pass filters exhibit cut-off frequencies substantially equal to the allocated broadcast bandwidth; and the left-channel and right-channel higher pass channels are formed of parallel band-pass and high pass filters, with the upper cut-off frequency of the band-pass filter being substantially equal to the lower cut-off frequency of the high pass filter. In this embodiment, the signal passed by each band-pass filter is gain controlled as a function of the level of the submodulation component within the band-pass range. Furthermore, the left-channel and right-channel signals which are passed by the high pass filters also are gain controlled as a function of the level of the mono or submodulation component lying within the upper half of the allocated bandwidth.

BRIEF DESCRIPTION OF THE DRAWINGS

The following detailed description, given by way of example, will best be understood in conjunction with the accompanying drawings in which.

DETAILED DESCRIPTION OF CERTAIN PREFERRED EMBODIMENTS

Figure 1:
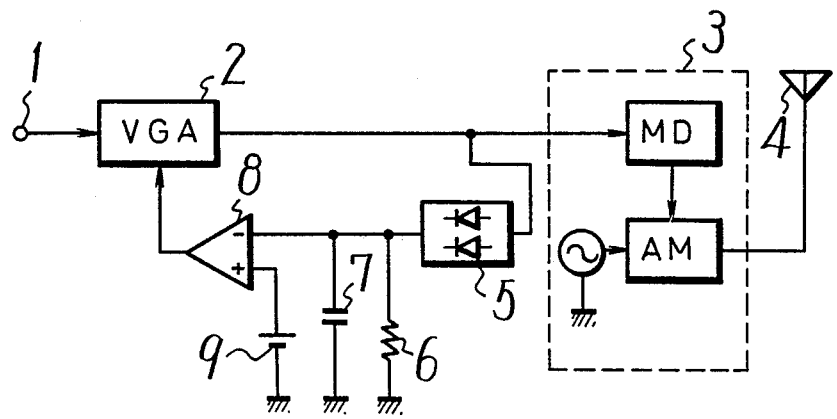
FIG. 1 is a block diagram of an amplitude limiter which does not offer the advantages of the present invention.

The present invention will best be appreciated by first referring to the amplitude limiter shown in FIG. 1, which limiter suffers from the disadvantages described above. This limiter is used in conjunction with an AM broadcast system wherein an audio frequency signal is supplied to an amplitude modulator 3 for modulating a carrier, and the amplitude modulated carrier is transmitted by an antenna 4. The amplitude limiter is comprised of a variable gain amplifier 2, a full wave rectifier 5, a comparator 8 and a reference source 9 for providing a threshold level representing a desired modulation level.

Variable gain amplifier 2 may be of conventional construction and is coupled to an input terminal 1 to which a low pass filter (not shown) having a cut-off frequency equal to approximately ½ of the allocated bandwidth supplies an audio frequency signal. As mentioned above, and as used herein, an "allocated bandwidth" is that bandwidth in which most of the energy of a broadcasted signal must reside. In the United States, the allocated bandwidth for AM transmission is equal to 30 KHz. In Japan, for example, this allocated bandwidth is equal to 15 KHz. The sideband energy of the transmitted AM signal must remain substantially within the allocated bandwidth. In particular, 99% of the energy of the broadcasted AM signal must remain within the allocated bandwidth. If this allocated bandwidth is represented as BW, then, for AM transmission in the United States, BW=30 KHz. Accordingly, the low pass filter (not shown) which is coupled to input terminal 1 has an upper cut-off frequency of BW/2=15 KHz. Variable gain amplifier 2 thus is supplied with an audio frequency signal, such as a sound or music signal, limited in the range of 0 to 15 KHz, or 0 to BW/2.

The amplified audio frequency signal is supplied by variable gain amplifier 2 to amplitude modulator 3 whereat the amplified audio frequency signal modulates the amplitude of the broadcast carrier for transmission. In addition, the level of the amplified audio frequency signal is fed back to a level detector which controls the gain of the variable gain amplifier as a function of the detected level of the amplified audio frequency signal. The feedback circuit is comprised of full wave rectifier 5, a delay circuit comprised of resistor 6 and capacitor 7, and comparator 8. Rectifier 5 serves to provide a rectified, DC signal representing the level of the amplified audio frequency signal. This rectified signal is applied to the inverting input of comparator 8, and the non-inverting input of this comparator is supplied with the threshold voltage level produced by reference source 9. It may be appreciated that comparator 8 may comprise a difference amplifier, such as an operational amplifier, or the like. Comparator 8 produces a gain control signal which is supplied to variable gain amplifier 2.

When the rectified audio frequency signal produced by full wave rectifier 5 exceeds the threshold level provided by reference source 9, comparator 8 supplies a gain-reducing control signal to variable gain amplifier 2 to reduce the gain of that amplifier. Hence, the amplitude of the audio frequency signal provided at the output of the variable gain amplifier is reduced. Accordingly, in the event that the modulation level of the audio frequency signal tends to become excessive, resulting in overmodulation of the carrier which it modulates, the illustrated feedback path reduces the gain of variable gain amplifier 2 so as to reduce the modulation level of this audio frequency signal. The time delay circuit comprised of resistor 6 and capacitor 7 functions to delay the termination of the gain-reducing signal supplied to the variable gain amplifier by comparator 8 when the modulation level of the audio frequency signal decreases below the threshold level established by reference source 9. Thus, in the event that the level of the audio frequency signal falls abruptly, as may be due to spurious noise or the like, the gain of variable gain amplifier 2 nevertheless is maintained at its lower level to prevent overmodulation when the audio frequency signal returns to its high level. That is, release of the variable gain amplifier is delayed to account for noise or brief reductions in the audio frequency signal level.

As mentioned above, in a typical AM transmission system, the modulation level of the modulating signal, that is, the amplitude of the audio frequency signal, should be less than 100%. The threshold level provided by reference source 9 may be selected to be about 95 to 100% of the maximum modulation level so as to avoid excess modulation. Hence, when the fedback audio frequency signal exceeds this 95 to 100% modulation level, the gain of variable gain amplifier 2 is reduced; and excessive, or overmodulation, is avoided.

The amplitude limiter illustrated in FIG. 1 may be used to limit the amplitude of the mono component (L+R) in an AM transmission system. For example, the audio frequency signal supplied to variable gain amplifier 2 may be the summed combination of left-channel (L) and right-channel (R) audio signals. In the event that the AM broadcast system is an AM stereo system, the mono component (L+R) serves to amplitude modulate the carrier, and a stereo, or submodulation component (L−R) also is transmitted. As mentioned above, in one type of AM stereo transmission system, the submodulation component (L−R) is used to modulate the phase of the carrier. In other AM stereo transmission systems, this submodulation component may modulate the amplitude or frequency of a subcarrier. When the illustrated amplitude limiter is used in an AM stereo transmission system, both the mono component (L+R) and the submodulation component (L−R) should be amplitude limited so that, together, they do not exceed a modulation level of 100%. This may be achieved by utilizing another amplitude limiter, similar to that shown in FIG. 1, to limit the amplitude of the submodulation component. Suitable threshold levels may be applied to the comparators in the respective amplitude limiters. Alternatively, since the left-channel (L) and right-channel (R) signals are used to produce both the mono and submodulation components, separate left-channel and right-channel amplitude limiters may be used to limit the amplitudes of the left-channel and right-channel audio signals prior to the combination thereof in the mono and submodulation components. Accordingly, the amplitude limiter shown in FIG. 1 may be used to limit the modulation level of the left-channel audio signal, and a separate, similar amplitude limiter may be used to limit the modulation level of the right-channel audio signal.

Figure 2:
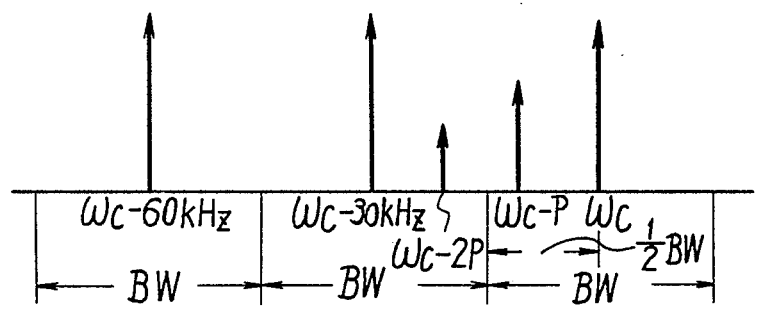
FIG. 2 is a spectral representation of the signals which may be produced as a result of the amplitude limiter shown in FIG. 1.

In a monaural AM transmission system, as well as in an AM stereo transmission system, it is possible that, because of bias conditions, signal sources, the information represented by the signals, or the like, one of the left-channel (L) and right-channel (R) signals may become much greater than the other. That is, the mono and/or submodulation component may deviate, or be biased, toward the left-channel or right-channel. If P represents a particular audio frequency, and if the mono or submodulation component is biased toward one or the other of the left-channel and right-channels signals, as mentioned above, a second harmonic component may be produced in the AM sideband. As illustrated in FIG. 2, the normal sideband of the AM signal contains the fundamental frequency component $\omega_c-P$. In addition, the second harmonic component $\omega_c-2P$ also is produced. In FIG. 2, the fundamental component $\omega_c-P$ lies within the allocated bandwidth BW and, more precisely, this component lies within the frequency range ½BW in the lower sideband. However, the second harmonic $\omega_c-2P$ of this component lies outside the allocated bandwidth and, as illustrated, this second harmonic component falls within an adjacent allocated bandwidth. The energy of this second harmonic component is related to the bias of the mono or submodulation component in the transmitted signal. Consequently, if one or the other of the left-channel and right-channel audio signals exhibits a relatively large amplitude, then, even if the other signal exhibits a relatively smaller amplitude, the undesired second harmonic component $\omega_c - 2P$ may be produced. This second harmonic component may interfere with the sideband of the transmitted signal which is broadcasted in the adjacent frequency band.

FIG. 2 illustrates a second harmonic component of a single audio frequency P. It is appreciated that an audio signal is comprised of a spectrum of audio frequencies. Hence, rather than resulting in the second harmonic component of a single audio frequency, the AM signal which is actually transmitted will be accompanied by a secondary spectrum comprised of the second harmonics of these audio frequencies. Moreover, higher order spectra, such as ternary or quaternary (e. g. third and fourth harmonics) of the primary audio spectrum may result. This tends to interfere with the signals which are transmitted in other allocated bandwidths. This interference is not easily prevented or minimized by the amplitude limiter arrangement illustrated in FIG. 1. More particularly, with this amplitude limiter, audio signals having frequencies from, for example, BW/4 to BW/2, such as typical music signals, with relatively high amplitudes, or with such signals biased to the left-channel or right-channel, secondary or higher order spectra containing secondary and higher order harmonics of such audio frequency signals may be produced. Such spectra lie outside the bandwidth which is allocated for transmission on the carrier $\omega_c$ and, thus, interfere with and distort signals which are broadcasted in adjacent allocated bandwidths on, for example, carriers ($\omega_c \pm 30$ KHz), ($\omega_c \pm 60$ KHz), and the like.

In a practical AM broadcast system, a small portion of the sideband energy will lie outside the allocated bandwidth. However, such secondary and higher order spectra energies should be limited to less than 1% ($-20$ dB) of the total sideband energy. That is, more than 99% of the energy modulated onto a broadcast carrier should be limited to the allocated bandwidth. This is achieved, in accordance with the broad objectives of the present invention, by limiting the modulation level of the audio signals to 50% maximum in the frequency band of BW/4 to BW/2 (i. e. the audio signals whose frequencies range from 7.5 KHz to 15 KHz are limited to a maximum modulation level of 50%). By so limiting the audio signals in this frequency band, the energy included in secondary and higher order spectra will be minimal and will not be greater than $-20$ dB.

Figure 3:
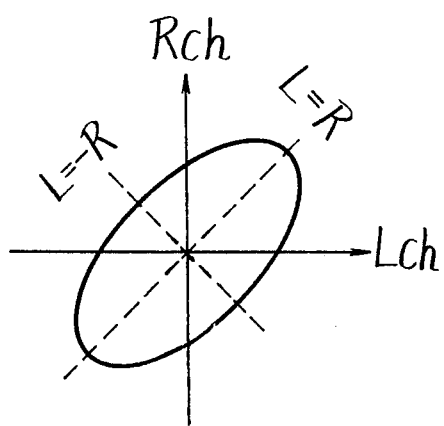
FIGS. 3 and 4 are graphical representations which are useful in understanding the advantages attained by the present invention.

In a typical stereophonic signal source having left-channel and right-channel signals, the energy thereof generally is concentrated in the direction of $L = R$, such as graphically depicted in FIG. 3. The mono component ($L + R$) thus is provided with greater energy than the submodulation component ($L - R$). In the direction of $L = -R$ (FIG. 3), the energy is only on the order of about one-half to one-third of the energy in the $L = R$ direction. This means that, in the typical stereophonic signal source, the audio signals are biased toward the $L = R$ direction. Consequently, when using the amplitude limiter shown in FIG. 1, interference with an adjacent broadcasted signal, as represented by FIG. 2, and as described above, may result.

Figure 4:
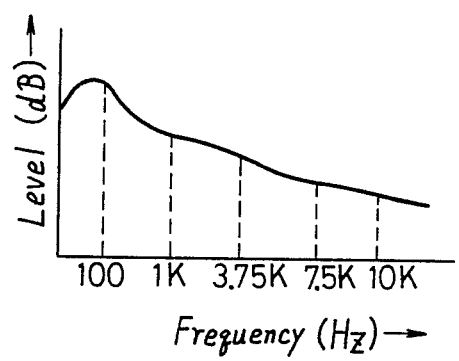

As mentioned above, minimal higher order spectral energies are produced if the modulation level of the audio signals in the frequency range BW/4 to BW/2 are limited to 50% maximum. Such audio frequency signals typically are music signals. FIG. 4 is a graphical representation of the spectral energy of a music signal. It is seen that, in the higher frequency range, a music signal has relatively low energy. Consequently, out-of-band energies may be minimized by maintaining the energy of the broadcasted AM stereo signal substantially within the allocated bandwidth without loss of music quality even if the modulation level of the audio frequency signals in the frequency range BW/4 to BW/2 is limited to about 30% maximum.

Figure 5:
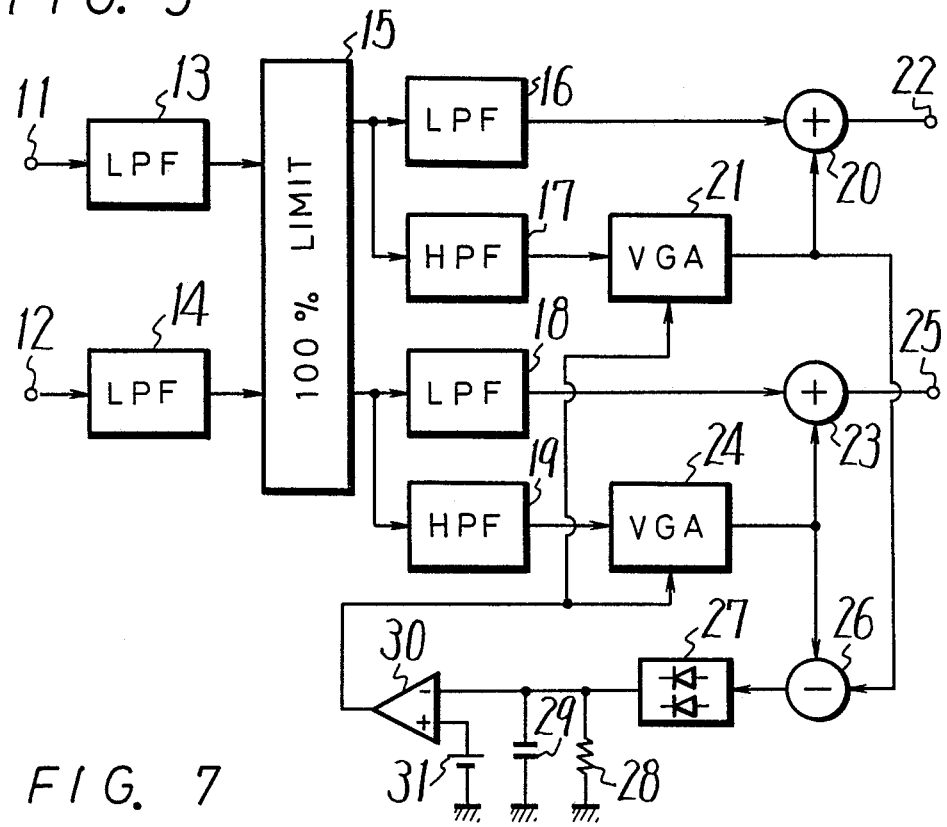
FIG. 5 is a block diagram of one embodiment of the present invention.

Preferred embodiments of the present invention now will be described. Reference first is made to the embodiment shown in FIG. 5 which is a block diagram of an amplitude limiter of the type that may be used advantageously in an AM stereo transmitter. The limiter is comprised of left-channel and right-channel signal processing circuits which are of similar construction. A low pass channel including a low pass filter 16 is connected to receive a left-channel signal (L), and a similar low pass channel including a low pass filter 18 is connected to receive the right-channel signal (R). These left-channel and right-channel signals which are supplied to the respective low pass channels are frequency-limited by respective low pass filters 13 and 14. Low pass filter 13 is coupled to an input terminal 11 to receive the left-channel signal (L) provided by a suitable stereophonic signal source, and low pass filter 14 is coupled to input terminal 12 to receive the right-channel signal (R) of that source. In the embodiment of FIG. 5, each of low pass filters 13 and 14 exhibits an upper cut-off frequency equal to $\frac{1}{2}$BW (e. g. an upper cut-off frequency on the order of about 15 KHz for broadcast transmission systems in the United States). Thus, the left-channel and right-channel signals are limited by these low pass filters to be well within the allocated broadcast bandwidth BW (BW = 30 KHz in the United States), and in the illustrated embodiment, the left-channel and right-channel signals are limited to $\frac{1}{2}$BW. An amplitude limiter circuit 15, which may be similar to the limiter circuit shown in FIG. 1, is coupled to receive each of the left-channel and right-channel signals and is adapted to limit each such signal to a modulation level of 100% maximum. It is appreciated that separate amplitude limiters of the type shown in FIG. 1 may be provided for the left-channel and right-channel signals, respectively. The frequency and amplitude limited left-channel and right-channel signals are supplied to the respective low pass channels illustrated in FIG. 5.

In addition to the respective low pass channels which are coupled to the outputs of limiter 15, respective higher pass channels also are coupled thereto. The higher pass channel coupled to receive the left-channel signal (L) includes a high pass filter 17 having a lower cut-off frequency which is substantially equal to the upper cut-off frequency of low pass filter 16, this frequency being equal to about $\frac{1}{4}$BW (e. g. the cut-off frequency being equal to about 7.5 KHz in the United States). Likewise, the higher pass channel which is coupled to receive the frequency and amplitude limited right-channel signal (R) includes high pass filter 19 whose lower cut-off frequency is substantially equal to the upper cut-off frequency of low pass filter 18. Each higher pass channel also includes a variable gain amplifier connected in series with the high pass filter. As illustrated, variable gain amplifier 21 is connected in series with high pass filter 17 and variable gain amplifier 24 is connected in series with high pass filter 19. Although the variable gain amplifiers are shown as following the high pass filters, they may be connected so as to precede these filters.

The outputs of the low pass channel and higher pass channel for, for example, the left-channel signal (L) are coupled to a combining or summing circuit 20. Likewise, the outputs of the low pass channel and the higher pass channel for the right-channel signal (R) are coupled to a summing circuit 23. It is seen that each respective low pass channel is not provided with an additional variable gain amplifier and, thus, it will be recognized that the lower frequencies of the left-channel and right-channel signals (L) and (R) may exhibit modulation levels up to 100%.

Summing circuit 20 has an output coupled to an output terminal 22 to supply the lower frequencies (i. e. below ¼BW) and the higher frequencies (¼BW to ½BW) of the left-channel signal to this output terminal. The amplitudes of these higher frequencies are, however, controlled by variable gain amplifier 21 in a manner described below.

Likewise, summing circuit 23 supplies to output terminal 25 the lower frequencies of the right-channel signal (R) which are passed by the low pass channel and the higher frequencies of this signal, as passed by the higher pass channel. Output terminal 25 thus is provided with the right-channel signal (R) whose higher frequencies are amplitude-controlled by variable gain amplifier 24.

It will be seen that the combination of low pass filter 13 and high pass filter 17 tends to limit the frequency band of the higher frequencies included in the left-channel signal (L) to those frequencies which lie between the lower cut-off frequency of high pass filter 17 (e. g. ¼BW) and the upper cut-off frequency of low pass filter 13 (e. g. ½BW). In the United States broadcast systems, the higher frequencies of the left-channel signal (L) thus are constrained in the pass band from 7.5 KHz to 15 KHz. Likewise, the combination of low pass filter 14 and high pass filter 18 tends to limit the higher frequency pass band of the right-channel signal (R).

The output of the higher pass channel provided for the right-channel signal (R), such as the output of variable gain amplifier 24, is subtracted from the output of the higher pass channel provided for the left-channel signal (L). A subtracting circuit 26 has respective inputs coupled to these respective higher pass channels, as illustrated, to produce a difference signal (L−R) which, it is recognized, is the stereo or submodulation component. Since the signals supplied to subtractor 26 are band-limited in the range from ¼BW to ½BW, it will be appreciated that the output of subtractor 26, that is, the submodulation component produced thereby, is frequency band-limited to this same frequency range. In accordance with the United States AM transmission frequency band allocations, the submodulation component produced by subtractor 26 is frequency band-limited to the range of 7.5 KHz to 15 KHz.

This frequency band-limited submodulation component is rectified by a full wave rectifier 27, resulting in a DC level representing the frequency band-limited submodulation component. This rectified signal is supplied to one input of a comparator 30, the other input thereof being supplied with a predetermined voltage level produced by a reference source 31. In addition, a delay, or time constant circuit, comprised of parallel-connected resistor 28 and capacitor 29 is coupled to the output of rectifier 27. Comparator 30, which may comprise a difference amplifier, operational amplifier or the like, has its output coupled to each of variable gain amplifiers 21 and 24 and is adapted to supply a gain-reducing signal thereto when the rectified, frequency band-limited submodulation component applied thereto by rectifier 27 exceeds the predetermined threshold level provided by reference source 31. The time constant circuit formed of resistor 28 and capacitor 29 is similar to the aforementioned time constant circuit illustrated in FIG. 1 and is adapted to delay the termination of this gain-reducing signal when the level of the frequency band-limited submodulation component falls below the threshold level. In the embodiment of FIG. 5, the threshold level provided by reference source 31 is equal to a modulation level, or degree, of 50%. Thus, when the amplitude of the frequency band-limited submodulation component (L−R) exceeds the 50% level, the gains of variable gain amplifiers 21 and 24 are reduced so as to correspondingly reduce the amplitude of this submodulation component.

In the illustrated embodiment, it is preferred, although not absolutely necessary, to provide low pass filters 13 and 14 to limit the frequency range to ½BW (e. g. 0 to 15 KHz) of the left-channel and right-channel signals which are supplied to the amplitude limiter coupled to the outputs of limiter 15. This limited frequency range ensures that the transmitted sideband of the AM stereo signal is constrained within the bandwidth allocated thereto.

In operation, it is seen that summing circuit 20 is supplied with substantially all of the frequencies of the left-channel audio signal in the frequency range of 0 to ½BW (e. g. from 0-15 KHz). Likewise, summing circuit 23 is provided with substantially all of the frequencies of the right-channel signal in the range of from 0 to ½BW. Aside from limiter 15, which conventionally limits the modulation level of the left-channel and right-channel signals to 100% maximum, the lower frequencies in each of these channels are not further amplitude limited. However, the higher frequencies of the left-channel and right-channel signals are controlled, or limited, by variable gain amplifiers 21 and 24, respectively. In the event that the amplitude, or modulation level, of the frequency band-limited submodulation component (L−R) in the range of from ¼BW to ½BW (e. g. in the range of from 7.5 KHz to 15 KHz) exceeds the preset threshold level provided by reference source 31, the amplitudes of the higher frequency components of the left-channel and right-channel signals are reduced. In the embodiment described herein, the preset threshold level provided by reference source 31 is equal to a modulation level of 50%. Thus, if the modulation level of the higher frequency components of the submodulation component (L−R) exceeds 50%, the gains provided by variable gain amplifiers 21 and 24 are reduced so as to reduce the modulation level of this submodulation component. Hence, a maximum modulation level thereof of 50% is maintained. Of course, if the amplitude of the frequency band-limited submodulation component is below the 50% modulation level, the gain of each of variable gain amplifiers 21 and 24 is not reduced.

By limiting the maximum modulation level of the submodulation component (L−R) in the frequency range of from ¼BW to ½BW (e. g. in the frequency range of from 7.5 KHz to 15 KHz) to less than 50% maximum, the generation of secondary, ternary and higher order spectra is minimized. That is, the energy of the broadcasted AM stereo signal outside the allocated bandwidth BW is controlled to be less than −20 dB. Consequently, by reason of the amplitude limiter illustrated in FIG. 5, harmonic energy due to excessive modulation of the carrier by the AM stereo signal is minimized. Therefore, there is little interference or distortion of a transmitted signal broadcasted in an adjacent or near adjacent frequency band due to such harmonic energy which would be present in those adjacent or near adjacent frequency bands.

With the embodiment shown in FIG. 5, the amplitude, or level, of the submodulation component (L−R) in the desired frequency band of from ¼BW to ½BW is detected by comparator 30 and used to control the amplitudes of the left-channel and right-channel signals in that same frequency band in the event that the detected level is too high. However, the use of low pass filters 13 and 14 tends to cut off the higher frequency components of the left-channel and right-channel signals. Although this has no effect upon speech, the loss of higher frequency components of music signals may deleteriously affect the quality of the music sounds ultimately reproduced. This is particularly noticeable in those broadcast systems having very narrow allocated bandwidths, such as those broadcast systems in Japan wherein the allocated bandwidth is 15 KHz and the cut-off frequencies of low pass filters 13 and 14 are on the order of 7.5 KHz. This possible difficulty is avoided by the embodiment illustrated in FIG. 6.

Figure 6:
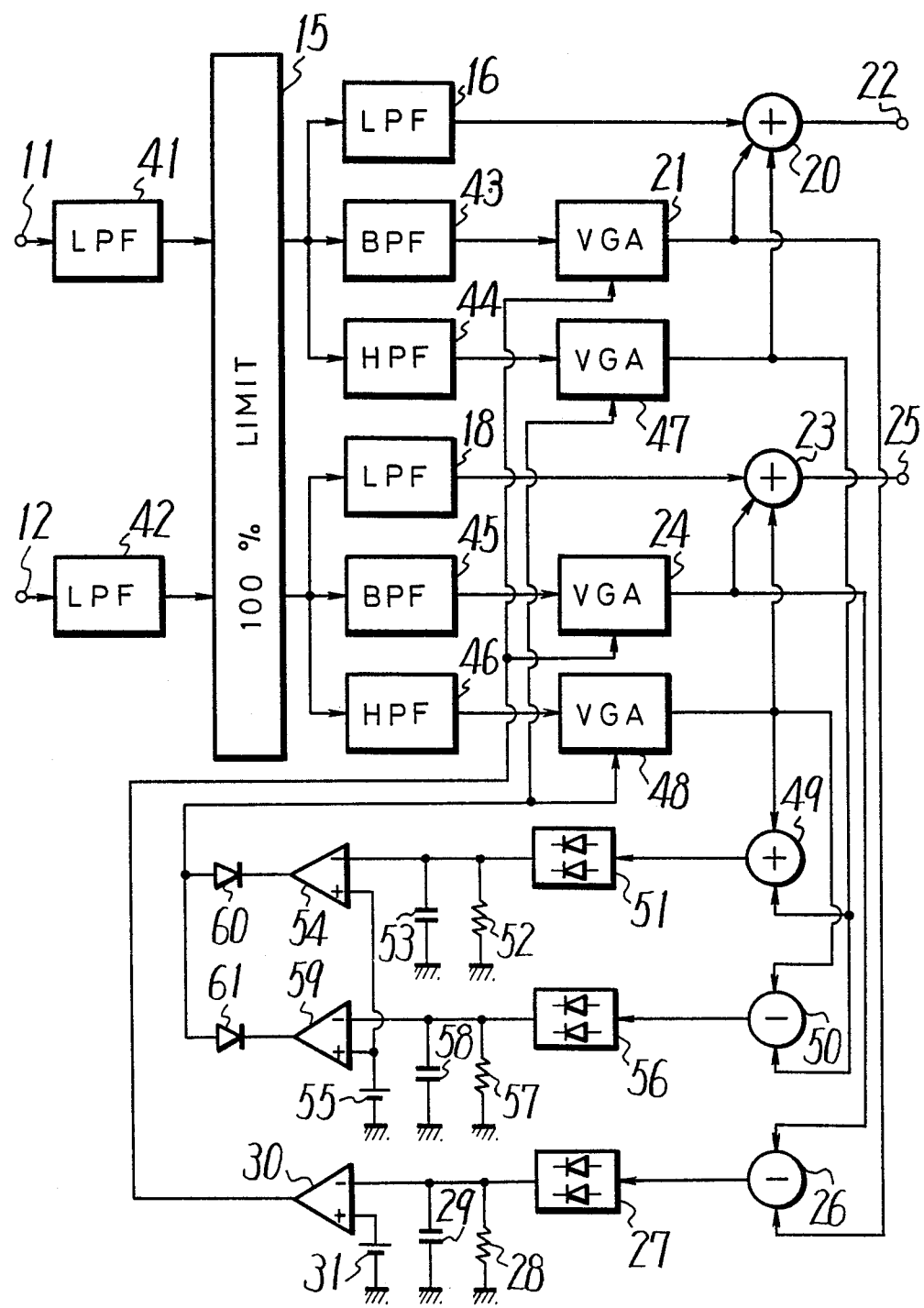
FIG. 6 is a block diagram of another embodiment of this invention.

The amplitude limiter shown in FIG. 6 is similar to that shown in FIG. 5, and like reference numerals are used to identify like component parts. In the FIG. 6 embodiment, however, the low pass filters which supply the left-channel and right-channel signals to limiter 15 exhibit upper cut-off frequencies equal to BW (e. g. an upper cut-off frequency on the order of 30 KHz in the United States). Thus, low pass filter 41 passes left-channel signals (L) in a frequency range equal to the allocated bandwidth; and, similarly, low pass filter 42 passes right-channel signals (R) in this same frequency range.

A further difference in the embodiment shown in FIG. 6 with respect to the FIG. 5 embodiment described above is that the higher pass channel for each of the left-channel and right-channel signals is comprised of a band pass channel in parallel with a high pass channel. For the left-channel signals (L), the band pass channel includes a band pass filter 43 whose pass band is from ¼BW to ½BW (e. g. 7.5–15 KHz), and the output of this band pass filter is coupled to variable gain amplifier 21. The high pass channel includes a high pass filter 44 whose lower cut-off frequency is ½BW, and the output of this high pass filter is coupled to variable gain amplifier 47. It is appreciated that, in each of the band pass and high pass channels, the variable gain amplifiers may follow or precede the filters. The outputs of the low pass, band pass and high pass channels provided for left-channel signal (L) are summed by summing circuit 20.

Similarly, for the right-channel signal (R), the band pass channel is comprised of band pass filter 45 connected in series with variable gain amplifier 24. The high pass channel is comprised of a high pass filter 46 connected in series with a variable gain amplifier 48. The pass band of band pass filter 45 is substantially equal to the pass band of band pass filter 43. Likewise, the lower cut-off frequency of high pass filter 46 is substantially equal to the lower cut-off frequency of high pass filter 44. The outputs of the low pass, band pass and high pass channels for the right-channel signal (R) are summed in summing circuit 23.

It is recognized that the band pass channels in the embodiment of FIG. 6 are similar to the high pass channels in the embodiment of FIG. 5, wherein the frequencies passed through these respective channels are within the band of ¼BW to ½BW (e. g. 7.5–15 KHz). In the FIG. 6 embodiment, as in the embodiment of FIG. 5, subtractor 26 is coupled to receive the pass band limited left-channel and right-channel signals to produce the frequency band-limited submodulation component (L−R). The level of this frequency band-limited submodulation component is detected by comparator 30 and, in the event that the modulation level of this submodulation component exceeds the 50% level represented by reference source 31, comparator 30 supplies gain-reducing control signals to variable gain amplifiers 21 and 24. Thus, as in the embodiment of FIG. 5, the modulation level of the left-channel and right-channel signals in the frequency band of ¼BW to ½BW is limited to 50% maximum.

The modulation level for the higher frequency components included in the left-channel and right-channel signals, that is, the modulation level of these signals in the upper half of the allocated bandwidth (e. g. 15–30 KHz) is limited by variable gain amplifiers 47 and 48 to, for example, 7% to 10% maximum. The higher frequency components of the left-channel and right-channel signals, as provided at the outputs of the respective higher pass channels, are summed in a summing circuit 49 and are subtracted from each other in a subtracting circuit 50. Summing circuit 49 thus produces the mono component (L+R) whose frequency components are limited to the upper half of the allocated bandwidth (e. g. these frequency components are in the range of 15–30 KHz). Subtracting circuit 50 produces the submodulation components (L−R) in this same frequency band, that is, in the upper half of the allocated bandwidth (e. g. 15–30 KHz). The higher frequency mono component produced by summing circuit 49 is rectified by a full wave rectifier 51 and is coupled to a comparator 54 whereat it is compared, or level-detected, with a pre-set level corresponding to 7% to 10% of the modulation level, as provided by reference source 55. A delay, or time constant circuit, comprised of a parallel-connected resistor 52 and capacitor 53 is coupled to the output of rectifier 51 and serves substantially the same purpose as the time constant circuit which is coupled to the output of rectifier 27.

The higher frequency submodulation component (L−R) produced by subtracting circuit 50 is rectified by a full wave rectifier 56 and is compared, or level-detected, by a comparator 59 with the pre-set level provided by reference source 55. A delay, or time constant circuit, comprised of parallel-connected resistor 57 and capacitor 58 is coupled to the output of rectifier 56.

The outputs of comparators 54 and 59 are coupled through diodes 60 and 61 to supply a gain-reducing control signal to each of variable gain amplifiers 47 and 48, these variable gain amplifiers being included in the higher pass channels for the left-channel and right-channel signals. Diodes 60 and 61 function to supply the gain-reducing signal produced by comparators 54 and 59 having the greater gain-reduction value. For example, if the modulation level of the higher frequency submodulation component (L−R) exceeds the modulation level of the higher frequency mono component, then the gain-reducing signal produced by comparator 59 will be supplied to variable gain amplifiers 47 and 48 so as to reduce the gains of these amplifiers by an amount greater than what otherwise be reduced if the gain-reducing signal produced by comparator 54 were to be supplied thereto.

It is recognized that, in the embodiment of FIG. 5, the left-channel and right-channel signals provided at output terminals 22 and 25 are limited, by reason of low pass filters 13 and 14, to the lower half of the allocated bandwidth (e. g. below 15 KHz). However, in the embodiment of FIG. 6, since low pass filters 41 and 42 have respective pass bands which are substantially equal to the allocated bandwidth (e. g. 30 KHz), output terminals 22 and 25 are supplied with left-channel and right-channel signals whose frequencies lie within the entire allocated band. Consequently, in the embodiment of FIG. 6, higher frequency components are not cut off as they are in the embodiment of FIG. 5. This results in music signals of higher fidelity. However, in order to prevent such higher frequency components from giving rise to higher order spectra outside the allocated bandwidth when the AM stereo signal is transmitted, the modulation level of the higher frequency components, that is, the modulation level of those signals which lie in the upper half of the allocated bandwidth (e. g. those signals whose frequencies are in the range of 15-30 KHz) is limited to a maximum value of 7-10%. If the modulation level of the mono component in this higher frequency range exceeds this maximum level, comparator 54 supplies the gain-reducing signal to variable gain amplifiers 47 and 48, thereby reducing the level of this mono component. Similarly, if the modulation level of the submodulation component (L−R) in this frequency range exceeds the 7-10% modulation level, comparator 59 supplies the gain-reducing signal to the variable gain amplifiers.

Nevertheless, the embodiment of FIG. 6 is similar to that of FIG. 5 in that subtractor 26 and comparator 30 function to supply gain-reducing signals to variable gain amplifiers 21 and 24 in the event that the modulation level of the submodulation component (L−R) in the second quarter of the allocated bandwidth (e. g. having frequencies 7.5-15 KHz) exceeds the modulation level of 50%, as provided by reference source 31. Thus, audio signals in the mid-frequency range ¼BW to ½BW are amplitude-limited so as to avoid generating harmonics of the broadcasted signal, which harmonics are of frequencies that lie outside the bandwidth allocated to that transmitted signal. Also, the modulation level of the higher frequency components greater than ½BW is amplitude-limited, also to avoid generating harmonics of substantial energies outside the allocated bandwidth. The higher frequency components of the audio signals which are passed by the embodiment shown in FIG. 6 offer the additional advantage of improving the quality of, for example, music signals.

It is seen that adders 20 and 23 in the embodiment of FIG. 6 are provided with left-channel and right-channel signals, respectively, having lower frequencies (up to ¼BW) whose modulation level is permitted to reach 100%, mid-frequencies from ¼BW to ½BW whose modulation level is limited to 50%, and higher frequencies greater than ½BW whose modulation level is limited to 7-10%. These are the frequency-limited and amplitude limited components which comprise the left-channel and right-channel signals produced at output terminals 22 and 25, respectively.

Figure 7:
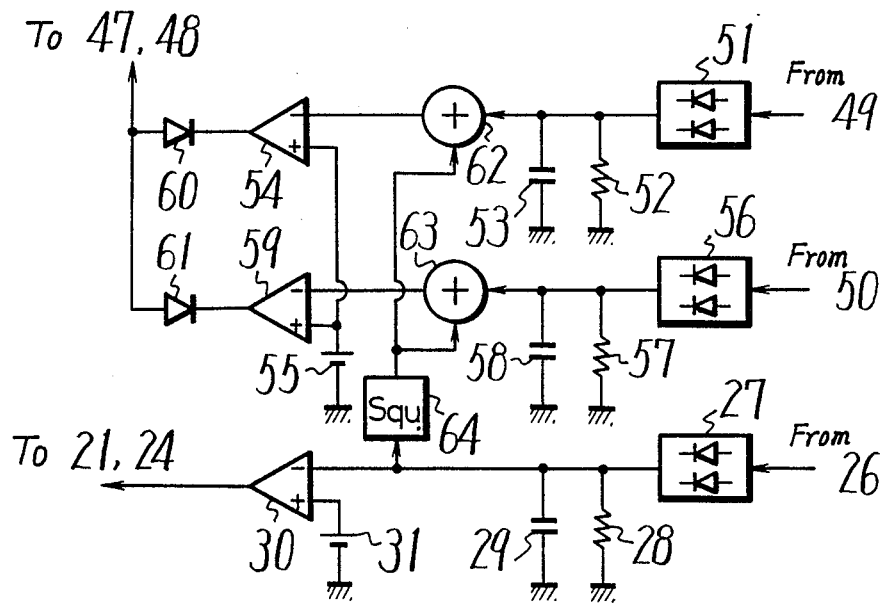
FIG. 7 is a block diagram of a still further embodiment of the present invention.

Yet another embodiment of the present invention is partially illustrated in FIG. 7. The FIG. 7 embodiment is intended to be utilized with the embodiment of FIG. 6, and only the essential portions of the modification of FIG. 6 are illustrated.

Components of the secondary spectrum (e. g. second harmonics), as well as higher order spectra, are attributed, to a great degree, to the square of the amplitude level of the submodulation component. When the mid-range (e. g. ¼BW to ½BW) frequency component of the submodulation component exhibits a relatively high level, the secondary and higher order spectra in the transmitted signal exhibit higher energies and, thus, tend to distort or interfere with a signal which is transmitted in adjacent allocated bandwidths. Such higher energy secondary spectra is minimized, in accordance with the embodiment of FIG. 7, by reducing the gain of the higher frequency components in the left-channel and right-channel signals. In particular, when the mid-range frequency component of the submodulation component increases, the level of the higher frequency components in the left-channel and right-channel signals supplied to summing circuits 20 and 23 is reduced. Conversely, when the mid-range frequency component of the submodulation component decreases, the amplitude level of the higher frequency components in the left-channel and right-channel signals supplied to summing circuits 20 and 23 is increased. This is implemented by modifying the embodiment of FIG. 6 in the manner illustrated in FIG. 7.

As shown in FIG. 7, the mid-range frequency components of the submodulation component (L−R), that is, the output of full wave rectifier 27, is subjected to a squaring operation (that is, it is mathematically squared) by a squaring circuit 64, the output of which is summed with the higher frequency component of each of the mono component (L+R) and submodulation component (L−R) as produced by full wave rectifiers 51 and 56, respectively. An adder 62 sums the output of squaring circuit 64 with the higher frequency component of the mono component (L+R) produced by full wave rectifier 51; and an adder 63 likewise sums the output of squaring circuit 64 with the higher frequency component of the submodulation component (L−R) produced by rectifier 56. The outputs of adders 62 and 63 are coupled to the inverting inputs of comparators 54 and 59, respectively.

It is appreciated that, when the submodulation component in the mid-frequency range (¼BW to ½BW) increases, the output of squaring circuit 64 becomes relatively high. This increases the level of the signal supplied by each of full wave rectifiers 51 and 56 to comparators 54 and 59, respectively. Consequently, even if the level of the mono component (L+R) in the higher frequency range (greater than ½BW) is less than the threshold level produced by reference source 55 (e. g. less than 7-10% modulation level), the sum of the squared mid-frequency component of the submodulation component and the higher frequency component of the mono component may exceed this threshold level. Likewise, even if the submodulation component (L−R) in the higher frequency range (greater than ½BW) is less than the 7-10% modulation level established by reference source 55, the sum of this higher frequency component of the submodulation component and the output of squaring circuit 64 may exceed this pre-set modulation level. When the output of adder 62 or the output of adder 63 exceeds the preset modulation level represented by reference source 55, a corresponding one of comparators 54 and 59 supplies a gain-reducing signal to variable gain amplifiers 47 and 48. Hence, the higher frequency components of the left-channel and right-channel signals, as passed by the high pass channels, have their respective amplitudes reduced. Conversely, if the submodulation component (L−R) in the mid-frequency range (¼BW to ½BW) is at a relatively low level, the output of squaring circuit 64 likewise is relatively low and the higher frequency left-channel and right-channel components are permitted to increase to their maximum 7–10% modulation level. That is, the relatively low output of squaring circuit 64 does not substantially increase the higher frequency mono and submodulation components that are supplied to comparators 54 and 59 by adders 62 and 63, respectively.

As an alternative, the mid-frequency submodulation component supplied to comparator 30 by rectifier 27 may be increased when the higher frequency mono or submodulation components increase. This alternative may be carried out by summing the output of rectifier 27 with the outputs of rectifiers 51 and/or 56, and supplying the summed signal to comparator 30.

As discussed in detail above, the secondary spectrum in the broadcasted signal is a function of the mid-frequency submodulation component. Since the higher frequency components of the left-channel and right-channel signals (i.e. those components greater than ½BW) contribute to such secondary spectrum, the embodiment of FIG. 7 proceeds by reducing the amplitude level of such higher frequency left-channel and right-channel signals as a function of the mid-frequency submodulation component. This results in containing the broadcasted signal within the bandwidth allocated thereto. Furthermore, the embodiment of FIG. 7 improves the accuracy with which the signal level of the higher frequency components is detected. As an alternative embodiment, squaring circuit 64 may be omitted, and the output of rectifier 27, that is, the mid-frequency submodulation component, may be supplied directly to adders 62 and 63.

While the present invention has been particularly shown and described with reference to certain preferred embodiments, it will be readily appreciated by those of ordinary skill in the art that various changes and modifications in form and details may be made without departing from the spirit and scope of the invention. As mentioned above, in AM broadcast transmission in the United States, the bandwidth which is allocated to each carrier is on the order of 30 KHz. In Japan, for example, the bandwidth which is allocated to each carrier is on the order of 15 KHz. It is appreciated that, as used above, the expression "BW" is intended to mean the allocated bandwidth, and the precise frequency range of this allocated bandwidth is a function of the particular characteristics and requirements in different countries. Furthermore, although the present invention is readily applicable to AM stereo transmission, whereby the transmitted AM stereo signal is maintained within the same allocated bandwidth as normal, or "monaural" AM transmission, this invention may be applied to such monaural AM transmission systems. Overmodulation of the carrier is avoided in the low, mid- and high-frequency ranges of the information (e.g. audio) signal. Hence, harmonics and higher order spectra having substantial energies which lie outside the allocated bandwidth are minimized. It will also be appreciated that the threshold levels which are established by, for example, reference sources 31 and 55, need not be limited solely to those numerical examples described above. Other values representing other desired modulation degrees may be used. When used in conjunction with AM stereo transmission systems, the present invention need not be limited solely to one type or format thereof but, rather, may be used with those AM stereo transmissions which have been proposed for use in the United States and other countries.

It is intended that the appended claims be interpreted as including the foregoing as well as various other changes and modifications.

What is claimed is:

1. An amplitude limiter for use in an AM broadcast transmitter to minimize energy in the broadcasted signal outside an allocated broadcast bandwidth, said amplitude limiter comprising:

first and second input means for providing left-channel and right-channel signals within a predetermined frequency range;

respective low pass channels coupled to each of said input means, said low pass channels including low pass filter means having a predetermined upper cut-off frequency for passing said left-channel and right-channel signals, respectively, of frequencies below said cut-off frequency in the lower portion of said predetermined frequency range;

respective higher pass channels coupled to each of said input means, said higher pass channels including higher pass filter means having a predetermined lower cut-off frequency for passing said left-channel and right-channel signals, respectively, of frequencies above said predetermined lower cut-off frequency in an upper portion of said predetermined frequency range and variable gain amplifier means series-connected with said higher pass filter means for amplifying with controllable gain the left-channel and right-channel signals respectively passed by said higher pass channels;

respective summing means for summing the respective left-channel signals provided by the left-channel higher pass channel and the left-channel low pass channel and for summing the respective right-channel signals provided by the right-channel higher pass channel and the right-channel low pass channel; and gain control signal generating means responsive to said left-channel and right-channel signals provided by said respective higher pass channels to produce a signal representing a frequency band-limited submodulation component of the AM signal to be broadcasted and for generating and supplying a gain reducing signal to said respective variable gain amplifier means when said produced signal exceeds a predetermined level.

2. The amplitude limiter of claim 1 wherein the predetermined upper cut-off frequency of said respective low pass filter means is at approximately one-fourth of said predetermined frequency range.

3. The amplitude limiter of claim 1 wherein the predetermined lower cut-off frequency of said respective higher pass filter means is at approximately one-fourth of said predetermined frequency range.

4. The amplitude limiter of claim 1 wherein the predetermined upper cut-off frequency of said respective low pass filter means is approximately equal to the predetermined lower cut-off frequency of said respective higher pass filter means.

5. The amplitude limiter of claim 1 wherein said predetermined frequency range of said left-channel and right-channel signals corresponds to said allocated broadcast bandwidth.

6. The amplitude limiter of claim 5 wherein said first and second input means comprise further respective low pass filters, each having an upper cut-off frequency to limit the signals passed thereby to a spectrum within said predetermined frequency range.

7. The amplitude limiter of claim 1 wherein said gain control signal generating means includes threshold means for providing a threshold level representing a predetermined submodulation level; and comparator means for comparing said produced signal to said threshold level to generate said gain reducing signal when said produced signal exceeds said threshold level.

8. The amplitude limiter of claim 7 wherein said comparator means comprises a difference amplifier.

9. The amplitude limiter of claim 7 wherein said gain control signal generating means further includes subtracting means to subtract the right-channel signal from the left-channel signal provided by said respective higher pass channels to produce said signal representing the frequency band-limited submodulation component.

10. The amplitude limiter of claim 9 wherein said gain control signal generating means further includes rectifying means for rectifying said signal produced by said subtracting means; said comparator means being coupled to said rectifying means and to said threshold means to generate said gain reducing signal when the rectified signal exceeds the threshold level.

11. The amplitude limiter of claim 10 wherein said gain control signal generating means further includes a time constant circuit coupling said rectifying means to said comparator means for delaying termination of said gain reducing signal when the frequency band-limited submodulation component falls below said predetermined level.

12. The amplitude limiter of claim 1 wherein said AM broadcast transmitter is operative to broadcast an AM stereophonic signal having a carrier that is amplitude modulated in response to the sum of the signals provided by said respective summing means and that is submodulated in response to the difference between the signals provided by said respective summing means.

13. The amplitude limiter of claim 1 wherein said left-channel and right-channel signals are audio signals.

14. The amplitude limiter of claim 1 wherein each said respective higher pass channel comprises a band pass channel coupled to a respective one of said input means and including band pass filter means having a lower cut-off frequency approximately equal to the upper cut-off frequency of said low pass filter means and a predetermined upper cut-off frequency and a high pass channel coupled to said respective input means and including high pass filter means having a lower cut-off frequency approximately equal to the upper cut-off frequency of said band pass filter means; wherein each said respective variable gain amplifier means is included in at least said band pass channel and is series-connected to a respective band pass filter means; and wherein each said respective summing means sums the signals passed by respective low pass, band pass and high pass channels.

15. The amplitude limiter of claim 14 wherein the pass bands of the respective filter means are established such that each low pass channel passes signals within the lower quarter of said predetermined frequency range, each band pass channel passes signals within the second quarter of said predetermined frequency range, and each high pass filter means passes signals within the second half of said predetermined frequency range.

16. The amplitude limiter of claim 14 further including a variable gain amplifier included in respective high pass channels and series-connected to a respective high pass filter means for amplifying with adjustable gain the signals passed thereby; and wherein said gain control signal generating means comprises a first gain control circuit for reducing the gain of each variable gain amplifier means included in a band pass channel when said produced signal which represents the frequency band-limited submodulation component exceeds a predetermined level, and a second gain control circuit for reducing the gain of each variable gain amplifier included in a high pass channel when the sum or difference of the left-channel and right-channel signals passed by said high pass channels exceeds a pre-set level.

17. The amplitude limiter of claim 16 wherein said second gain control circuit comprises an adder for adding the left-channel and right-channel signals passed by said high pass channels; a subtractor for subtracting the right-channel signal passed by a respective one of the high pass channels from the left-channel signal passed by the other high pass channel; comparator means for comparing each of the summed signal produced by said adder and the difference signal produced by said subtractor to said pre-set level; and means for adjusting the gain of each variable gain amplifier included in the high pass channels when either the summed signal or the difference signal exceeds said pre-set level, the gain adjustment being by an amount determined by such excess.

18. The amplitude limiter of claim 17 wherein said pre-set level is less than said predetermined level.

19. The amplitude limiter of claim 16 wherein said second gain control circuit further includes means for increasing both the sum and the difference of the left-channel and right-channel signals passed by said high pass channels as a function of said produced signal.

20. The amplitude limiter of claim 19 wherein said means for increasing includes squaring means for producing a signal that is a function of the square of said produced signal; and combining means for combining the signal produced by said squaring means with each of said sum and difference of the left-channel and right-channel signals passed by said high pass channels.

21. An amplitude limiter for use in an AM stereophonic broadcast transmitter of the type which amplitude modulates a carrier with an (L+R) component and provides a submodulation (L−R) component, wherein L is the left-channel signal and R is the right-channel signal, the amplitude limiter being operative to minimize energy in the broadcasted signal outside an allocated broadcast bandwidth and comprising:

first and second input means for providing left-channel signals (L) and right-channel signals (R) within a predetermined frequency range;

respective low pass channels coupled to each of said input means, said low pass channels including low pass filter means having a predetermined upper cut-off frequency for passing said left-channel signals (L) and right-channel signals (R), respectively, of frequencies below said cut-off frequency in the lower portion of said predetermined frequency range;

respective band pass channels coupled to each of said input means, said band pass channels including band pass filter means having a lower cut-off frequency approximately equal to the upper cut-off frequency of said low pass filter means and a predetermined upper cut-off frequency and being series-connected with variable gain amplifier means for amplifying with controllable gain the left-channel signals (L) and right-channel signals (R) respectively passed by said band pass channels;

respective high pass channels coupled to each of said input means, said high pass channels including high pass filter means having a lower cut-off frequency approximately equal to the upper cut-off frequency of said band pass filter means and being series-connected with variable gain amplifying means for amplifying with controllable gain the left-channel signals (L) and right-channel signals (R) respectively passed by said high pass channels;

respective summing means for summing the respective left-channel signals (L) passed by the left-channel low pass, band pass and high pass channels and for summing the respective right-channel signals (R) passed by the right-channel low pass, band pass and high pass channels;

first gain control signal generating means responsive to said left-channel signals (L) and right-channel signals (R) passed by said respective band pass channels to produce a signal representing a frequency band-limited submodulation component of the AM stereophonic signal to be broadcasted and for generating and supplying a first gain reducing signal to the respective variable gain amplifier means included in said band pass channels when said produced signal exceeds a predetermined amount; and second gain control signal generating means to produce a second gain reducing signal for reducing the gain of each variable gain amplifying means included in the high pass channels when the sum or difference of the left-channel signals (L) and right-channel signals (R) passed by said high pass channels exceeds a pre-set level.

22. The amplitude limiter of claim 21 wherein said first gain control signal generating means includes threshold means for providing a threshold level representing a predetermined submodulation level; and comparator means for comparing said produced signal to said threshold level to generate said first gain reducing signal when said produced signal exceeds said threshold level.

23. The amplitude limiter of claim 22 wherein said first gain control signal generating means further includes subtracting means to subtract the right-channel signal (R) from the left-channel signal (L) provided by said respective band pass channels to produce said signal representing the frequency band-limited submodulation component.

24. The amplitude limiter of claim 23 wherein said first gain control signal generating means further includes rectifying means for rectifying said signal produced by said subtracting means; said comparator means being coupled to said rectifying means and to said threshold means to generate said first gain reducing signal when the rectified signal exceeds the threshold level.

25. The amplitude limiter of claim 24 wherein said first gain control signal generating means further includes a time constant circuit coupling said rectifying means to said comparator means for delaying termination of said first gain reducing signal when the frequency band-limited submodulation component falls below said predetermined level.

26. The amplitude limiter of claim 23 wherein said second gain control signal generating means includes an adder for adding the left-channel signals (L) and right-channel signals (R) passed by said high pass channels; a subtractor for subtracting the right-channel signal (R) passed by a respective one of the high pass channels from the left-channel signal (L) passed by the other high pass channel; a first comparator for comparing a summed signal (L+R) derived from said adder to said pre-set level; a second comparator for comparing a difference signal (L−R) derived from said subtractor to said pre-set level; and means for reducing the gain of each variable gain amplifying means included in the high pass channels when either the summed signal (L+R) or the difference signal (L−R) exceeds said pre-set level, the gain adjustment being by an amount determined by such excess.

27. The amplitude limiter of claim 26 wherein said pre-set level is less than said predetermined level.

28. The amplitude limiter of claim 26 wherein said second gain control signal generating means further includes a first rectifier for rectifying the signal produced by said adder and a second rectifier for rectifying the signal produced by said subtractor; said first comparator being coupled to said first rectifier and to said pre-set level, and said second comparator being coupled to said second rectifier and to said pre-set level.

29. The amplitude limiter of claim 26 wherein said second gain control signal generating means further includes means for increasing both the summed signal (L+R) and the difference signal (L−R) derived from said adder and subtractor, respectively, as a function of the signal produced by said first gain control signal generating means.

30. The amplitude limiter of claim 29 wherein said means for increasing includes squaring means for producing a signal that is a function of the square of said signal produced by said first gain control signal generating means; and combining means for combining the signal produced by said squaring means with each of said summed signal (L+R) and difference signal (L−R) derived from said adder and subtractor, respectively.

31. The amplitude limiter of claim 21 wherein said first and second input means comprise respective low pass filters, each having an upper cut-off frequency to limit the signals passed thereby to said predetermined frequency range.

* * * * *